United States Patent [19]

Branch

[11] Patent Number: 4,749,583

[45] Date of Patent: Jun. 7, 1988

[54] METHOD FOR MAKING AN EDIBLE CONTAINER FROM CORN

[75] Inventor: Billy W. Branch, DeSoto, Tex.

[73] Assignee: Innovative Food Merchandisers, Inc., Tulsa, Okla.

[21] Appl. No.: 930,153

[22] Filed: Nov. 12, 1986

[51] Int. Cl.$^4$ ............................................. A21D 8/02
[52] U.S. Cl. ..................... 426/549; 426/138; 426/439
[58] Field of Search .................. 426/138, 549, 439

[56] References Cited

U.S. PATENT DOCUMENTS

| | | | |
|---|---|---|---|
| 2,002,053 | 5/1935 | Doolin | 426/439 |
| 3,083,103 | 3/1963 | Anderson et al. | 426/549 |
| 3,928,638 | 12/1975 | Stickle | 426/138 |
| 3,930,049 | 12/1975 | Mattson | 426/549 |
| 4,313,964 | 2/1982 | Dembecki | 426/138 |

Primary Examiner—Raymond N. Jones
Assistant Examiner—Mary S. Mims
Attorney, Agent, or Firm—Robert B. Stevenson

[57] ABSTRACT

A process for manufacturing an edible container of processed corn by first preparing a creamy cohesive, cooked corn dough and then injecting or pumping the corn dough into a heated mold for sufficient time to bake the corn dough. The resulting molded, baked corn product is then allowed to equilibrate such that trapped moisture migrates to the surface and is then fried in cooking oil to a final moisture content of less than 2%.

6 Claims, No Drawings

METHOD FOR MAKING AN EDIBLE CONTAINER FROM CORN

BACKGROUND OF THE INVENTION

1. Field of the Invention

This invention relates to an edible container made from corn maize and a method of manufacturing such an edible container. More specifically, the invention relates to a method of molding, baking and then frying corn maize.

2. Description of the Prior Art

Corn is generally known and commonly used in many forms as a food for human consumption. As such, processed corn products span a variety of food forms, including, for example, breakfast foods, snack foods and chips, as well as such foods and breads and tortillas. However, certain types of processed foods have not been acceptable when made from corn. Thus, for example, and prior to the present invention, the manufacturing of cones from corn was considered unacceptable.

SUMMARY OF THE INVENTION

The present invention provides a method of manufacturing a novel, edible corn product that is molded, baked and optionally fried, thus providing an edible container. The molded/baked container can then be used to serve individual portions of various foods compatible with the edible corn container. As such, the container can be molded essentially into a convenient and/or novel form consistent with the intended end use.

Thus, the present invention provides a process for making a molded edible product of processed corn and a novel molded edible corn product made by the process comprising the steps of:

(a) first preparing a creamy cohesive but not adhesive cooked corn dough characterized by moisture content of approximately 65% water by sequentially:
  (i) cooking raw corn kernels in a calcium hydroxide solution at up to 212° F. for a period of about 10 to 20 minutes;
  (ii) cooling the cooked corn kernels to about 135° F. by the addition of quenching water;
  (iii) soaking the corn kernels for about 12 to 18 hours;
  (iv) draining and rinsing the corn kernels to remove cellulose hulls and excess calcium hydroxide;
  (v) milling the corn kernels; and
  (vi) adjusting the water content to approximately 65%;

(b) pumping the corn dough of step (a) into a heated mold and holding the dough in the mold such as to bake the molded dough for about 1.5 to about 2 minutes at a temperature not to exceed 390° F.; and (c) removing the molded baked corn product from the heated mold and allowing the molded, baked corn product to cool and equilibrate such that moisture trapped in the interior of the molded, baked corn product has sufficient time to migrate to the surface.

The present invention further provides that the process for making the molded, baked corn product as described above further comprises the step of frying the moisture equilibrated molded, baked corn product in hot cooking oil at a temperature not to exceed 395° F. for a time sufficient to reduce the final moisture content to less than 2%.

Preferably, the resulting molded, baked corn product is an edible food container such as a cone or the like.

It is an object of the present invention to provide a method of manufacturing an edible container out of corn. It is a further object of the present invention to provide an edible corn container that can be made by injection molding and baking to conform to any arbitrary shape. It is a further object of the present invention that the shape of the container be compatible with holding an individual serving of food. It is still a further object that the shaped container be compatible with further frying in cooking oil, thus producing an edible corn container also compatible with holding an individual serving of food. Fulfillment of these objects and the presence and fulfillment of additional objects will become apparent upon complete reading of the specification and attached claims.

DESCRIPTION OF THE PREFERRED EMBODIMENTS

The method of manufacturing the edible corn container according to the present invention involves first, the preparation of a creamy cohesive, but not adhesive, cooked corn dough followed by a combination of sequential steps of molding, baking and optionally, frying the corn dough. When the above corn dough is prepared according to the present invention and the subsequent processing steps are performed in combination, again according to the present invention, a finished edible product that will have a crunchy, crisp texture with a distinct corn flavor can be manufactured.

The overall commercial manufacturing process according to the present invention can be viewed as involving a sequence of steps generally comprising: the preparation of the cooked corn dough; product molding and baking; product cooling and moisture equilibration; product frying and final product packaging. Generally, an acceptable commercial product can be obtained after the cooling and moisture equilibration step following the molding/baking steps provided the moisture content of the finished product is of the order of 2% by weight or less (preferably 1.5% or less). As such, the product frying is viewed as optional, but desirable in that frying tends to enhance the crisp, crunch texture and accentuates the corn flavor. The product molding step can also be separated from the baking step; however, preferably the commercial process according to the present invention involves a combination molding/baking step wherein the corn dough is injected or pumped into a hot mold and held therein for a sufficient time to produce a molded/baked end product which is then to be finished by reducing the final moisture content to the desired level. Nevertheless, it should be appreciated that other methods of molding and baking as generally known in the art can be employed in the present process and as such, the invention should not be viewed as being unduly limiting.

The preparation of the cooked corn dough according to the present invention begins with raw corn kernels or the equivalent. In principle, any dried or substantially dried corn kernel, as generally known in the art, is acceptable. Preferably and advantageously, a 100% yellow dent corn characterized by a maximum of 6% dead germ or similar species is to be used and has been found to perform quite well in the present invention.

Typically, the raw corn is to be cooked in a steam jacketed kettle equipped with mixing arms or the equivalent to provide adequate mixing. The cooking of the corn kernels is performed in a water solution of calcium hydroxide. Preferably, a saturated calcium hydroxide/- water solution of such quantity to cover and totally immerse the corn kernels is to be employed. Such a solution is first put in the kettle or cooking vessel with the mixing arms running, in order to dissolve the calcium hydroxide as well as possible. The raw corn can then be added into the solution and the solution along with the raw corn solids can then be heated to a temperature approaching 212° F. or the boiling point. The cooking time after the solution and corn solids reach the cooking temperature will vary depending on the corn being used. Typically, cooking times will be approximately 10 to about 20 minutes. It is essential for uniform processing that each batch of cooked corn be cooked for approximately the same period of time at approximately the same temperature for a given lot of corn to be processed. In this manner, the subsequent product molding and baking, as well as additional steps, can be maintained and controlled such as to achieve consistency in the final product.

After the cooking of the corn kernels in the saturated calcium hydroxide solution, the batch of cooked corn is then to be deposited into a cooling vessel or the like and cooking water added in such quantities as to reduce the solution and corn solids temperature to approximately 135° F. This water quenching process generally requires a second vessel with xixing capabilities or the equivalent. The cooling step is necessary in order to stop gelation or cooking of the corn starch. Preferably, all batches are to be treated equally so that all corn kernels will be cooked to the same degree.

After the cooked corn has been properly cooled, the solution and corn are then allowed to soak for a sustained period of time usually not less than 12 hours and preferably, 18 hours or more, if necessary. Preferably, the soaking results in a corn kernel moisture content of about 47 to 51% by weight and the softening of the cullulose hulls.

At the end of the 12 to 14 hour soak period, the batch will then be washed. Typically, the batch of soaked corn kernels will be transferred to a corn washer unit or the equivalent, at which time, the cooking solution will be drained off and the corn kernels will then be washed and cleaned of the cullulose hulls and excessive calcium hydroxide. Typically, the corn after the washing process will exhibit a pH of approximately 8.3.

The washed corn according to the present invention can then be transferred to a wet corn mill. Commercially, this can be implemented by means of a cooling/drain conveyor that allows time for some cooling and for the surface water to drain off. The washed corn will then be metered into a mill that typically uses stones made from lava or aluminum oxide or the equivalent wherein the kernels are grounded into a dough. This dough will be a very creamy and very cohesive, but not adhesive, mixture provided that the cooking/soaking process previously described has been properly performed.

The next step according to the present invention is to adjust the water content of the milled corn to approximately 65% by weight water. Preferably, the milled corn will be transferred by a pumping system to a mixing vessel where sanitary water will be added in such quantities to bring the dough moisture to approximately 65% water. Conviently, this mixing vessel will be of such volume and the mixing time will be of sufficient duration to properly mix the wet dough and added water resulting in a homogeneous solution or mass. It is this homogeneous mass of cooked corn dough of approximately 65 weight % water content that can then be used in the injection molding and baking process according to the present invention to form the edible corn container.

After the desired moisture content has been achieved, the cooked corn dough can then preferably be metered, injected or otherwise pumped into the cavity of a heated mold or the equivalent wherein it will be formed into the desired shape and baked at a sufficient temperature and for a sufficient period of time to produce a baked corn container or object. The mold temperature preferably is not to exceed 390° F. The time in the molding/baking operation at temperatures approaching 390° F. is typically about 1.5 to 2 minutes. The baking temperature is considered critical in that excessive temperature will frequently result in an off flavor for the finished product.

It should be appreicated that the molding/baking steps according to the present invention, in principle, could be performed sequentially rather than simultaneously. However, the injection or pumping of the corn dough directly into a heated mold is preferred. At the end of the molding/baking cycle, the resulting product is allowed to equilibrate. Typically, this is achieved by depositing the molded/baked product onto a cooling conveyor. This conveyor should be of such length and configuration to allow for the cooling and equilibration of the baked product. This function is to assure that the moisture that might be trapped in the interior of the baked product will have sufficient time to migrate to the product surfaces. If equilibration is not done properly, any trapped moisture in the product will result in a blister or bubble during the subsequent optional frying process. In principle and in fact, the equilibrated, cooled, molded/baked product produced at this stage of the overall process is a commercially acceptable edible corn container or product provided that the final moisture content is below about 2 wt %.

The optional frying step according to the present invention usually involves a temperature controlled frying unit. Preferably, the frying unit employs a pair of superimposed traveling belts which are specially adapted to retain the shape of the original molded cone container by use of a plug/cavity mold between the belts. The product to be fried is retained between the belts in the plug/cavity provided to preserve the molded shape. The upper belt is used to hold down theproduct as it is immersed in the frying oil, thus stopping the corn product from floating to the surface. The frying oil in the frying unit can be any such cooking oil as generally known in the art. Preferably, the frying oil is a vegetable oil and the frying oil temperature is not to exceed 395° F. The frying time for the product will vary depending upon the moisture of the product going into the unit, the mass of the molded corn product and the like. Experience indicates that the frying times will typically average from about 1 to about 2 minutes. Preferably, male molds on the traveling fryer belt will be employed to insure the product being fried will retain the shape of the original baking mold, during the frying process. The 395° F. maximum controlled temperature will insure that the product will not develop an off flavor, and will help in control of the oil uptake in the fried products. Preferably, excess surface oil is to be removed from the product prior to the product exiting the fryer unit. Experience indicates that maintaining the final moisture content of the finished product after frying at a level of 2% by weight water or less is critical in maintaining the crunchy, crisp texture of the product and the distinctive corn flavor, as well as to insure acceptable basic shelf lives of the products of at least six weeks under normal conditions. Upon exiting the fryer unit, the molded/baked fried product is preferably allowed to cool on a conveyor or the equivalent to a maximum temperature of approximately 95° F. Products packaged at temperatures greater than 95° F. have a tendency to create a vacuum in the package as the product cools, therefore, causing air and moisture to be introduced into the package during storage or the like. Air and moisture in the package has been found to accelerate the oxidation of the oil and/or cause the product to become soggy. Typically, a finished molded/baked/fried product according to the present invention will consist of about 71.5 to 66% by weight corn solids, about 38 to 32 weight % oil, and about 1.5 to 2% by weight water.

The following examples are presented to further illustrate the overall method according to the present invention and the specific advantages associated with the resulting product manufactured by the method according to the present invention.

EXAMPLE I

Using an existing commercial cooking system facility located in Tulsa, Oklahoma, 200 pounds of 100% yellow dent corn characterized by less than 6% dead germ and less than 8% broken kernels was immersed in sufficient water to completely cover the corn kernel mass. One pound of calcium hydroxide had been added to the water and fixed thoroughly. Using an exterior heat source, the temperature of the solution and corn solid was brought up to 210° F. over a period of approximately 20 minutes. The corn mass was then allowed to cook for an additional 9 minutes with mixing. At the end of the 9 minutes, sufficient cold quench water was added to the cooked batch and mix to reduce the solution and corn solid temperature to 135° F. The batch of cooked corn solids was then allowed to soak without stirring for 18 hours. At the end of this soak time, the corn kernel contained from about 47 to 51% water.

At the end of the soaking cycle, the corn was washed in a rotary cylinder corn washer unit. The washed corn exiting the rotary washer unit was checked for removal of cellulose shell. Approximately 95% of the cellulose shell had been removed from the corn by the washer unit. The washed cooked corn kernels were then milled in a masa mill using lava millstones. The stone gap setting was such that the milled product exiting the mill had a slight gritty texture and the product was very cohesive, but not adhesive. The milled product temperature was not allowed to exceed 125° F. The pH of the milled corn masa was approximately 8.3. Immediately after milling, the masa was placed into plastic bags and sealed. The product was placed in shipping containers and packed with dry ice for transportation to Hamilton, Ontario.

EXAMPLE II

Using an existing commercial scale cone manufacturing facility located in Haxilton, Ontario, equipped with Franz Haas baking ovens set up to manufacture ice cream cones from wheat flour dough, the corn masa prepared in Example I was processed into molded/baked final products. Initially, sufficient water was mixed into the corn masa produced in Example I resulting in a corn masa dough characterized by a water content of about 65%. The Franz Haas baking ovens were then preheated to a standard baking temperature used for the wheat cones and the prepared corn masa dough was poured into the baking molds by hand without the use of a mold release agent to prevent sticking to the baking molds. At the completion of the baking cycle, the corn product exited the baking molds without sticking.

A second test was then made at a different Haas baking oven that was at that time continuously producing wheat cones. The second oven was producing wheat cones of a different size and shape relative to the first run. In order not to completely disrupt and interrupt the wheat cone production line in total, one set of molds were selected to receive the corn masa as the system continued to operate. As the selected molds came to the feeding station, the wheat product feed was momentarily stopped and the selected molds were hand fed with corn masa. At the end of the baking cycle, the corn cones were deposited onto the stacking conyeyor along with the wheat cones. There was no evidence of sticking in the mold and the product was of excellent quality.

Using the above procedures, corn masa prepared according to the present invention has been successfully molded/baked at other commercial wheat cone manufacturing facilities using contemporary commercial cone molds, equipment and equipment operating procedures. In each case, the molded/baked product exhibits excellent quality in terms of molding, baking, lack of sticking to the mold, stacking, shelf life and structural integrity consistent with, if not superior to, standards of the wheat cone industry. Furthermore, the molded/baked product after final dehydration exhibits excellent corn flavor and texture, again, consistent with the contemporary commercial corn product industry. Also, the molded product according to the present invention can be further baked or fried to enhance the cooked flavor and crisp texture of the final product. As such, the final products according to the present invention are edible corn containers that structurally are considered superior to other prior art corn products in that the container is crisp, but not fragile. Consequently, the final products according to the present invention have been found to be consistent with retaining and holding individual portions of wet, hot foods without disintegrating and still be selectively edible along with the individual food servings being held within the container without having the container disintegrate prematurely.

Having thus described the invention with a certain degree of particularity, it is to be understood that the invention is not limited to the embodiments set forth herein for purposes of exemplification, but is to be limited only by the scope of the attached calims, including a full range of equivalents to which each element thereof is entitled.

I claim:
1. A process for making a molded edible product of processed corn comprising the steps of:
   (a) first preparing a creamy cohesive but not adhesive cooked corn dough characterized by moisture content of approximately 65% water by sequentially:
      (i) cooking raw corn kernels in a calcium hydroxide solution at up to 212° F. for a period of about 10 to 20 minutes;
      (ii) cooling the cooked corn kernels to about 135° F. by the addition of quenching water;

(iii) soaking the corn kernels for about 12 to 18 hours;
(iv) draining and rinsing the corn kernels to remove cellulose hulls and excess calcium hydroxide;
(v) milling the corn kernels; and
(vi) adjusting the water content to approximately 65%;
(b) pumping the corn dough of step (a) into a heated mold and holding the dough in the mold such as to bake the molded dough for about 1.5 to about 2 minutes at a temperature not to exceed 390° F.; and
(c) removing the molded baked corn product from the heated mold and allowing the molded, baked corn product to cool and equilibrate such that moisture trapped in the interior of the molded, baked corn product has sufficient time to migrate to the surface.

2. A process of claim 1 further comprising frying the moisture equilibrated moled, baked corn product in hot cooking oil at a temperature not to exceed 395° F. for a time sufficient to reduce the final moisture content to less than 2%.

3. A process of claim 1 wherein the molded, baked corn product is a food container.

4. A process of claim 3 wherein the molded, baked corn product is a food container.

5. A process of claim 1 wherein the molded, baked corn product is a cone.

6. A process of claim 2 wherein the molded, baked corn product is a cone.

* * * * *